US009959575B2

United States Patent
Elkins et al.

(10) Patent No.: US 9,959,575 B2
(45) Date of Patent: May 1, 2018

(54) VIN BASED INSURANCE CLAIM SYSTEM

(75) Inventors: Tanya Elkins, Milwaukie, OR (US);
Sergey Gorelov, West Linn, OR (US);
Daryoush Joobbani, Tigard, OR (US)

(73) Assignee: Audatex North America, Inc., San Diego, CA (US)

( * ) Notice: Subject to any disclaimer, the term of this patent is extended or adjusted under 35 U.S.C. 154(b) by 237 days.

(21) Appl. No.: 13/440,751

(22) Filed: Apr. 5, 2012

(65) Prior Publication Data
US 2013/0268298 A1 Oct. 10, 2013

(51) Int. Cl.
*G06Q 40/00* (2012.01)
*G06Q 40/08* (2012.01)

(52) U.S. Cl.
CPC ............ *G06Q 40/08* (2013.01); *G06Q 40/00* (2013.01)

(58) Field of Classification Search
CPC .............................. G06Q 40/00; G06Q 40/08
USPC ........................................................ 705/4, 35
See application file for complete search history.

(56) References Cited

U.S. PATENT DOCUMENTS

| | | | | |
|---|---|---|---|---|
| 5,454,672 A | * | 10/1995 | Halpin | B60P 3/08 410/24 |
| 5,777,451 A | * | 7/1998 | Kobayashi | G08G 1/166 180/169 |
| 5,838,251 A | * | 11/1998 | Brinkmeyer | B60R 25/04 307/10.2 |
| 5,950,169 A | * | 9/1999 | Borghesi | G06Q 40/08 705/4 |
| 2006/0095302 A1 | * | 5/2006 | Vahidi | G06Q 40/00 705/4 |
| 2008/0103785 A1 | * | 5/2008 | Logan | 705/1 |
| 2012/0123951 A1 | * | 5/2012 | Hyatt et al. | 705/305 |

OTHER PUBLICATIONS

Lawrence S. Powell, Kathleen A. McCullough, Patrick F. Maroney and Cassandra R. Cole, Consumer Choice in Auto Repair: The Politics and Economics of Automobile Insurance Repair Practices, Sep. 2010, National Association of Mutual Insurance companies, web, 2-24 (Year: 2010).*

* cited by examiner

*Primary Examiner* — I Jung Liu
(74) *Attorney, Agent, or Firm* — Ben J. Yorks; Irell and Manella, LLP (57) ABSTRACT

An insurance claim system that can display vehicle identification key information and vehicle option, package, engine, transmission, paint, production date information provided from multiple different sources. The system can perform a method that includes displaying at least one insurance claim with at least one vehicle description, a plurality of vehicle options, and a VIN field. A VIN is entered into the VIN field, which is decoded to determine vehicle information and vehicle option information. One or more vehicle options displayed by the client computer are selected with the vehicle option information, and the selected vehicle options are modified with supplemental vehicle options information provided by an OEM source. Modifying the vehicle options with the information provided by the OEM source improves the accuracy of the options information selected on the insurance claim page.

12 Claims, 11 Drawing Sheets

| | | | |
|---|---|---|---|
| Claim # : 2345634523541234 | Desc: | Status: Assigned | Gross Total: |

VIN Selection

Assignment VIN     Inspection VIN    *102*     Reason For No VIN

[ Copy ]   WDBWK54F86F121718

AudaVIN Information Received.

Vehicle Information

◉ Vehicle Selection  *104*   ○ Vehicle Not Listed    *106*         *108*

Origin: European    Make: Mercedes-Benz    Year: 2006

Model: SLK280    Style: STD 2D Convertible 2WD Gasoline

*110*         *112*

Engine: 6cyl Gasoline 3.0    Transmission: 7-Speed Automatic

Mileage:    *114*   Typical Mileage:    *116*   Mileage Type: Actual

Other Vehicle Information

Lic. Plate:    Lic. State:    Lic. Expire:

Condition:    Veh Insp#:    Prod Date:

Paint Code      Color

Exterior:

Interior Trim:

---

| | | | |
|---|---|---|---|
| Claim # : 2345634523541234 | Desc: | Status: Assigned | Gross Total: |
| 2006 Mercedes-Benz SLK280 | | | |

Packages and Options    Aftermarket Items

Packages            Package Description

☐ Comfort Package(T)     *Comfort Package(T)*
☐ Heating Package(T)     -Includes Automatic Dimming Mirror, Driver Seat Memory, Dual Power
☑ *Premium Package*     Seats, Pwr Tilt/Tele. Str Wheel
☐ Wood Trim Package     *Heating Package(T):*
               -Included Heated Front Seats, AIRSCARF Ventilated Headrest
               *Premium Package:*

Options

Optional Equipment

☐ Automatic Dimming Mirror(T)    ☐ Cargo/Trunk Liner    ☐ Cellular Telephone
☐ Driver Seat Memory(T)    ☐ Dual Power Seats(T)    ☑ *Garage Door Opener*
☐ Headlight Washers    ☐ Heated Front Seats(T)    ☐ Harman Kardon Sound Sys
☑ *AM/FM In-dash CD Changer*    ☐ Leather/Wood Steer Wheel    ☑ *Metallic Paint*
☐ Navigation System    ☐ Pwr Tilt/Tele. Str Wheel(T)    ☐ Run-Flat/Self-Seal Tires
☑ *Rain-Sensing W/S Wipers*    ☐ Sirius Satellite Radio    ☐ Tire Pressure Monitor
☐ Wood Interior Trim    ☐ Xenon Headstamps Optional Equipment ☑ *Anti-lock Brakes*    ☑ *Air Conditioning*    ☑ *Alarm System*

☐ None         (S)Standard, (T) - Typical      *100*

*FIG. 3A*

| | | | |
|---|---|---|---|
| Claim # : 2345634523541234 | Desc: | Status: Assigned | Gross Total: |
| 2006 Mercedes-Benz SLK280 | Packages and Options Aftermarket Items | | |

Packages — Package Description

- ☐ Comfort Package(T)
- ☐ Heating Package(T)
- ☑ *Premium Package*  _118_
- ☐ Wood Trim Package

*Comfort Package(T)*
-Includes Automatic Dimming Mirror, Driver Seat Memory, Dual Power Seats, Pwr Tilt/Tele. Str Wheel

*Heating Package(T):*
-Included Heated Front Seats, AIRSCARF Ventilated Headrest

*Premium Package:*

Options

| | | |
|---|---|---|
| ☑ Floor Mats | ☑ Fog Lights | ☑ Head Airbags |
| ☑ Heated W/S Wiper Washers | ☑ Intermittent wipers | ☑ Keyless Entry System |
| ☑ Limited Slip Differential | ☑ Lighted Entry System | ☑ Leather Steering Wheel |
| ☑ Leather Seats | ☑ Power Brakes | ☑ Power Door Locks |
| ☑ Pwr Retractable Hardtop  _120_ | ☑ Power Steering | ☑ Power Windows |
| ☑ Rool Over Prot. System | ☑ Rem Trunk-L/Gate Release | ☑ Slide Airbags |
| ☑ Stability Cntrl Suspension | ☑ Emergency S.O.S System | ☐ Rear Spoiler |
| ☑ Strg Wheel Radio Control | ☑ Tachometer | ☑ Trip Computer |
| ☑ Traction Control System | ☑ Theft Deterrent System | ☑ Telescopic Steering Wht |
| ☑ Tonneau/Cargo Cover | ☑ Tinted Glass | ☑ Tilt Steering Wheel |
| ☑ Windblock/Windstop Panel | | |

☐ None          (S)Standard, (T) - Typical

Matt Trank | Status | Pre-Linking | Linking        USA | Log Out [PROD]

▽ Provider Model Linking Filters

| HS | 31 | | | < | | > |
|----|----|----|----|----|----|----|
| HT | 37 | | | A | | MANUFACTURER |
| UT | | | | | | MODEL |
| | | | | | | LOCAL VERSION NAME |

Submit   Reset    Deep search mode ☐

| | SRC | PROVIDER CODE | HS | HT | UT | AV | MF MODEL CODE | MF CODE | CHK | |
|---|-----|---------------|----|----|----|----|---------------|---------|-----|---|
| ○ | | 109101 | 31 | 37 | AA | | 210065 | | ☑ | |
| ○ | 270 | 109161 | 31 | 37 | CA | | 210070 | | ☑ | |
| ○ | | 111116 | 31 | 37 | AA | | 210082 | | ☑ | |
| ○ | | 111118 | 31 | 37 | CA | | 210083 | | ☑ | |
| ○ | | 111119 | 31 | 37 | AA | | 210265 | | ☑ | |
| ○ | | 111120 | 31 | 37 | AA | | 210282 | | ☑ | |
| ○ | | 111121 | 31 | 37 | DA | | 210074 | | ☑ | |

| DATE | HS | HT | UT | AV | MF MODEL CODE | MF CODE | PROVIDER CODE 2 |
|------|----|----|----|----|---------------|---------|-----------------|

No records

Total: 31 records   1 ▽   page 1/3   >   >>

Save   Validate   Disable     Copy from country    Canada ▽    Add Date   Delete Date Copy Values                      Paste Value QA Report

DATA PROVIDER
No model selected.
Please, double click left grid record to select a model.

| Doug Baker | Status | Pre-Linking | Linking | Post-Linking | Administration | | | USA | Log Out [PROD] |

Model Selection

Manufacturer (HS) [31 ▼]  Model (H/T) [37 ▼]  [Load Work List]

☐ Header Information    ☐ Log Information

⇨ Work list filters

| MF CODE | |
|---|---|
| MF CODE CHECKED | |
| DESCRIPTION | xenon |

[Submit] [Reset]

| MF CODE | MF CODE CHECKED | DESCRIPTION |
|---|---|---|
| ⊙ 3982 | 00/147, 00/148 | ○ Option Package E1 includes Headlight Washers; [xenon] Headlamps |
| ⊙ 3982 | 00/147 | ○ Option Package E1 includes Heated Headlamp Washers; [xenon] |
| ⊙ 3982 | 00/147 | ○ Option Package E1 includes Heated Headlamp Washers; [xenon] |
| ⊙ 3982 | 00/147 | ○ Option Package E1 includes [xenon] Headlamps; Heated Headlamp |
| ⊙ 3982 | 00/147 | ○ Option Package E1 includes [xenon] Headlamps; Rain Sensing |
| ⊙ 3982 | 00/147 | ○ Option Package E1 includes [xenon] Headlamps; Rain Sensing |
| ⊙ 3982 | 00/147 | ○ Option Package E1 includes [xenon] Headlamps; Rain Sensing |
| ⊙ XEH | 00/612 ⏎ 274 | ○ [xenon] Headlamps |

Total: 8 records [1 ▼] page 1/1

VIN OPTION LINKING

⇨ Audatex codes filters

| MF CODE | DESCRIPTION | AV CODE |
|---|---|---|
| ⊙ 00/003 | [vehicle with manually controlled | |
| ⊙ 00/004 | AV-WAGEN | |
| ⊙ 00/005 | VERSUCH UT. ERPROBUNG | |
| ⊙ 00/006 | SONDERTESTWAGEN, VERSUCH UT, | |
| ⊙ 00/007 | VERSURCH SIFI, KAROSSERIE- | |
| ⊙ 00/008 | KUNDENNAHE FAHRERPROBUNG- | |
| ⊙ 00/009 | FOTO | |
| ⊙ 00/010 | FAHRERPROBUNG W50 | |
| ⊙ 00/011 | FAHRERPROBUNG W67 | |
| ⊙ 00/012 | SCHULUNG/DIAGNOSE VP/S | |
| ⊙ 00/013 | AUSSTELLUNG (WENN NICHT CODE 997) | |
| ⊙ 00/014 | KUNDENNAHE FAHRERPROBUNG- | |
| ⊙ 00/015 | KD-TECHNIK | |
| ⊙ 00/016 | PRAXISTEST INLAND/EXPORT | |
| ⊙ 00/017 | NICHT KUNDENFAEHIGE FAHRZEUGE | |
| ⊙ 00/018 | FZGE. DE IN VERKAUFSF. ZUST. | |
| ⊙ 00/019 | PRAXISTESTFZGE., VORFUEHR-FZGE. | |
| ⊙ 00/020 | VORFUEHRWAGEN VERTRIEB | |
| ⊙ 00/021 | [designo LCP] DESIGNO- | |
| ⊙ 00/022 | [designo brown black] AUFBRAUCH | |

Total: 8545 records [1 ▼] page 1/86 > »

FIG. 5D

| Matt Trank | Status | Pre-Linking | Linking | | | | | USA | Log Out [PROD] |

Model Selection
Manufacturer (HS) [31 ▾]  Model (HT) [37 ▾]  [Load Work List]

☐ Header Information   ☐ Log Information

⇨ Work list filters

VIN OPTION LINKING

| MF CODE | DESCRIPTION | CHECKED AV CODE | | |
|---|---|---|---|---|
| ⊙ CONV | | | | |
| AC | ○ Air Conditioning | ☑ | AC | |
| ADM | ○ Automatic Dimming Mirror | ☑ | | |
| CNE | ○ Cargo/Trunk Net | ☐ | | |
| AAC | ○ Climate Control For A/C | ☑ | CI | |
| CC | ○ Cruise Control | ☑ | QE | |
| DZA | ○ Dual Zone Auto A/C — 276 | ☑ | DI,CI | |
| FLM | ○ Floor Mats | ☐ | | |
| GDO | ○ Garage Door Opener | ☐ | | |
| HWW | ○ Heated W/S Wiper Washers | ☑ | 2F,2G,JG | |
| PAS | ○ Parking Assist System | ☐ | | |
| ANT | ○ Power Antenna | ☐ | | |
| RSW | ○ Rain-Sensing W/S Wipers | ☑ | | |
| RRL | ○ Rear Reading Lights | ☐ | | |
| DEF | ○ Rear Window Defroster | ☑ | HC,HG,HW,RR | |
| RTR | ○ Rem Trunk-L/Gate Release | ☐ | | |

[Save]  [Sync AV CODE]  Total: 126 records  [1 ▾]  page 1/7  >  >>   [Copy from country]  [Canada ▾]

⇨ Audatex codes filters

| AC CODE | MF CODE | DESCRIPTION |
|---|---|---|
| No records | | |

Total: 0 records

VIN BASED INSURANCE CLAIM SYSTEM

BACKGROUND OF THE INVENTION

1. Field of the Invention

The subject matter disclosed generally relates to a method and system for generating an insurance claim for a vehicle.

2. Background Information

When a vehicle such as an automobile is damaged the owner may file a claim with an insurance carrier. A representative typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car's value, the representative may "total" the vehicle. The owner may then receive a check based on the value of the automobile.

The repair costs and other information may be entered by the representative into an estimate report. After inspection the representative sends the estimate report to a home office for approval. To improve the efficiency of the claims process there have been developed computer systems and accompanying software that automate the estimate process. By way of example, the assignee of the present invention, Audatex, Inc, ("Audatex") provides a software product under the trademark Audatex Estimating/Autosource that allows a representative to enter claim data. The Audatex software includes a VIN field that allows the user to enter the VIN (vehicle identification number) of the damaged vehicle. The VIN can be decoded to determine the matching vehicle(s). The vehicle identification process can also provide information regarding the standard options for the vehicle. Vehicle information can be also retrieved from a manufacturer proprietary vehicle database, also referred to as the vehicle identification key. Accurate vehicle information is essential to obtaining accurate repair cost and vehicle valuation data.

A vehicle may be modified by a third party such as a dealer or the owner so that the options information provided by the VIN decode process and/or vehicle identification key information is incomplete. This requires the user of the system, such as an insurance representative, to select or de-select the different options of the vehicle in the claim system. This can be a time consuming exercise that is ripe for error.

In addition, to the traditional claim inspection process where a representative directly enters the vehicle's physical inspection information into a claims application to produce an estimate or vehicle valuation request Audatex has the ability to provide a vehicle identification key (vehicle description, engine, transmission, options, packages, manufacture build date and paint). A representative will utilize this report as part of a physical inspection process to verify the loss vehicle's information. Once the physical inspection has been completed the vehicle inspection details can then be used to complete the vehicle information process within Audatex or another vendor's application for an estimate and/or vehicle valuation.

BRIEF SUMMARY OF THE INVENTION

An apparatus and method that includes displaying at least one insurance policy with at least one vehicle description, a plurality of vehicle options, and a Vehicle Identification Number (VIN) field. A VIN can be entered, which is decoded to determine key vehicle identification and option information. One or more vehicle options displayed by the client computer can be selected with the vehicle option information, and the selected vehicle options are modified with supplemental vehicle options information provided by an OEM source.

BRIEF DESCRIPTION OF THE DRAWINGS

FIGS. 3A and B are illustrations of a vehicle identification page with different vehicle information fields;

FIGS. 5A-D are illustrations showing the linking of OEM data with vehicle description keys;

DETAILED DESCRIPTION

Disclosed is an insurance application system that can display vehicle information and vehicle option information provided by two different sources. The system can perform a method that includes displaying at least one insurance vehicle identification page with at least one vehicle description, a plurality of vehicle options, and a VIN field. A VIN is entered into the VIN field, which is decoded to determine vehicle information and vehicle option information. One or more vehicle options displayed by a client computer can be selected with the vehicle option information, and the selected vehicle options can be modified with supplemental vehicle options information provided by an OEM source. An OEM source may include B2B, Direct Batch, Surrogate/3rd party or B2B Batch (OEM B2B/trx based; OEM data dumps; 3rd party B2B/trx based; 3rd party data dumps). Modifying the vehicle options with the information provided by the OEM source improves the accuracy of the vehicle description, engine, transmission, options, and packages information selected on the insurance vehicle identification page. Displaying the additional options provided by the VIN decode allows an representative to select/de-select options added or removed after manufacture of the vehicle.

Figure 1:
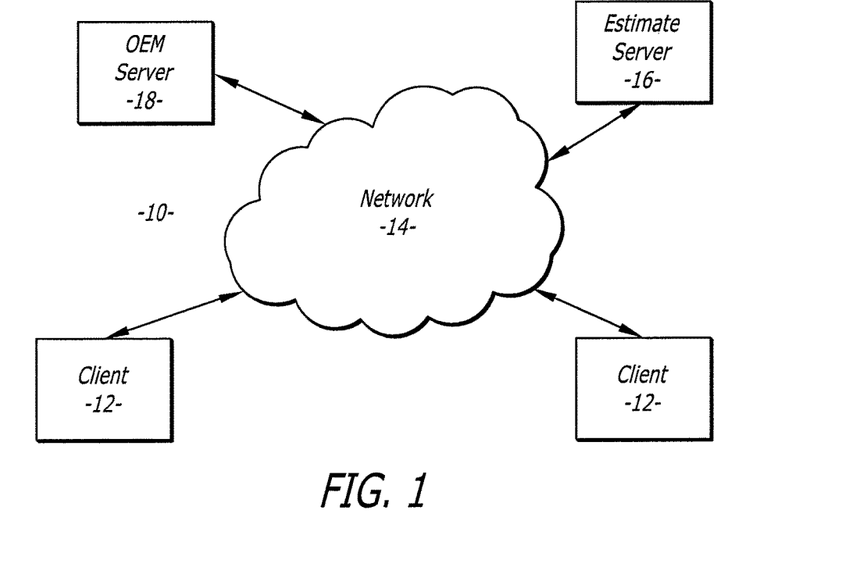
FIG. 1 is a schematic of a network system that can be used to generate an insurance inspection report for a damaged vehicle.

Referring to the drawings more particularly by reference numbers, FIG. 1 shows a system 10 that can be used to generate a repair cost estimate and/or vehicle valuation for an insurance claim of a vehicle. The system 10 includes at least one client 12 that is connected to an electronic communication network 14. The electronic communication network 14 may be a wide area network (WAN) such as the Internet. Accordingly, communication may be transmitted through the network 14 in TCP/IP format. The client could be any type of device that can access the network 14. For example, The system 10 may further include an claim server 16 connected to the network 14. The claim server 16 may provide a web based portal that provides access to a repair cost estimate and/or a vehicle valuation web site. The web site may provide one or more web pages that can be used by a representative to generate a repair cost estimate and/or a vehicle valuation. By way of example, the representative may utilize the web pages to determine the estimate and/or a vehicle valuation of a vehicle or claims adjuster submitting vehicle information on a theft claim, or a policy system that requires vehicle data to provide a price quote. Although one claim server 16 is shown, it is to be understood that the claim server may include two or more separate servers including a web server and an application server that together perform the claim functions.

The system also includes an OEM server 18 that can be coupled to the claim server 16 and clients 12 through the network 14. The OEM server 18 contains a database that includes vehicle model information and vehicle option information. The OEM server 18 may provide vehicle model information and vehicle options information based on a VIN. Although a web based system is shown and described, it is to be understood that a non-web based system could be employed.

Figure 2:
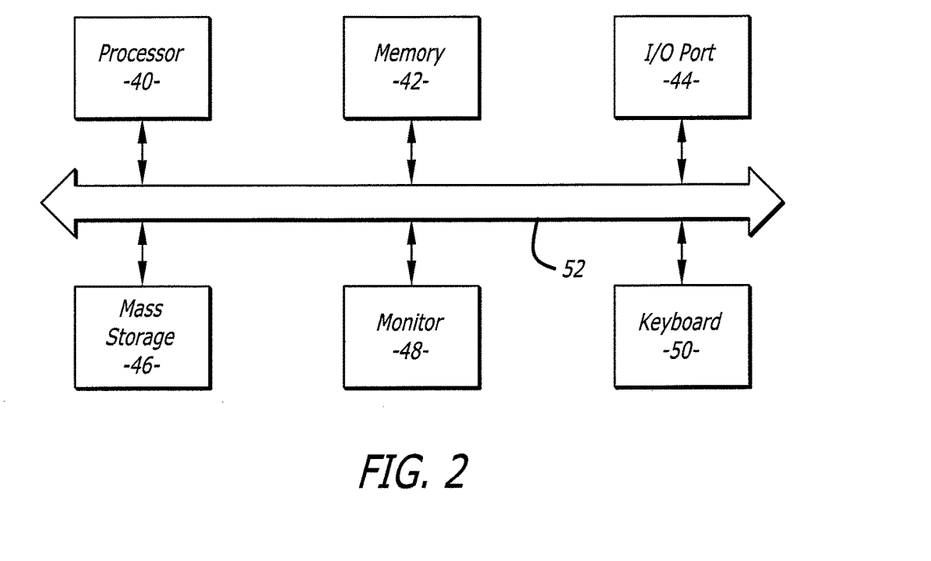
FIG. 2 is a schematic of a computer of the system.

FIG. 2 shows an embodiment of a client 12 and the servers 16 and 18. The computer 12 includes a processor 40 connected to one or more memory devices 42. The memory device 42 may include both volatile and non-volatile memory such as read only memory (ROM) or random access memory (RAM). The processor 40 is capable of operating software programs in accordance with instructions and data stored within the memory device 42.

The processor 40 may be coupled to a communication port 44, a mass storage device 46, a monitor 48 and a keyboard 50 through bus 52. The processor 40 may also be coupled to a computer mouse, a touch screen, a microphone, a speaker, an optical code reader (not shown). The communication port 44 may include an ETHERNET interface that allows data to be transmitted and received in TCP/IP format, although it is to be understood that there may be other types of communication ports. The system bus 52 may be a PCI or other conventional computer bus. The mass storage device 46 may include one or more disk drives such as magnetic or optical drives. The mass storage device 46 may also contain software that is operated by the processor 40.

Without limiting the scope of the invention the term computer readable medium may include the memory device 42 and/or the mass storage device 46. The computer readable medium may contain software programs in binary form that can be read and interpreted by the computer. In addition to the memory device 42 and/or mass storage device 46, computer readable medium may also include a diskette, a compact disc, an integrated circuit, a cartridge, or even a remote communication of the software program. In general the servers 16 and 18 may contain more memory, additional communication ports and greater processing power than the computer 12.

The servers 16 and 18 may contain relational databases that correlate data with individual data fields and a relational database management system (RDBMS). The RDBMS of the server 16 may include a reference to a website that can be accessed by the computers 12. The website has one or more specific uniform resource locators (URL) that can be used to access the site through the network 14. The URL can be entered through a web-based application resident in the client computer 12. By way of example, the web based application may be a browser.

Figure 3B:
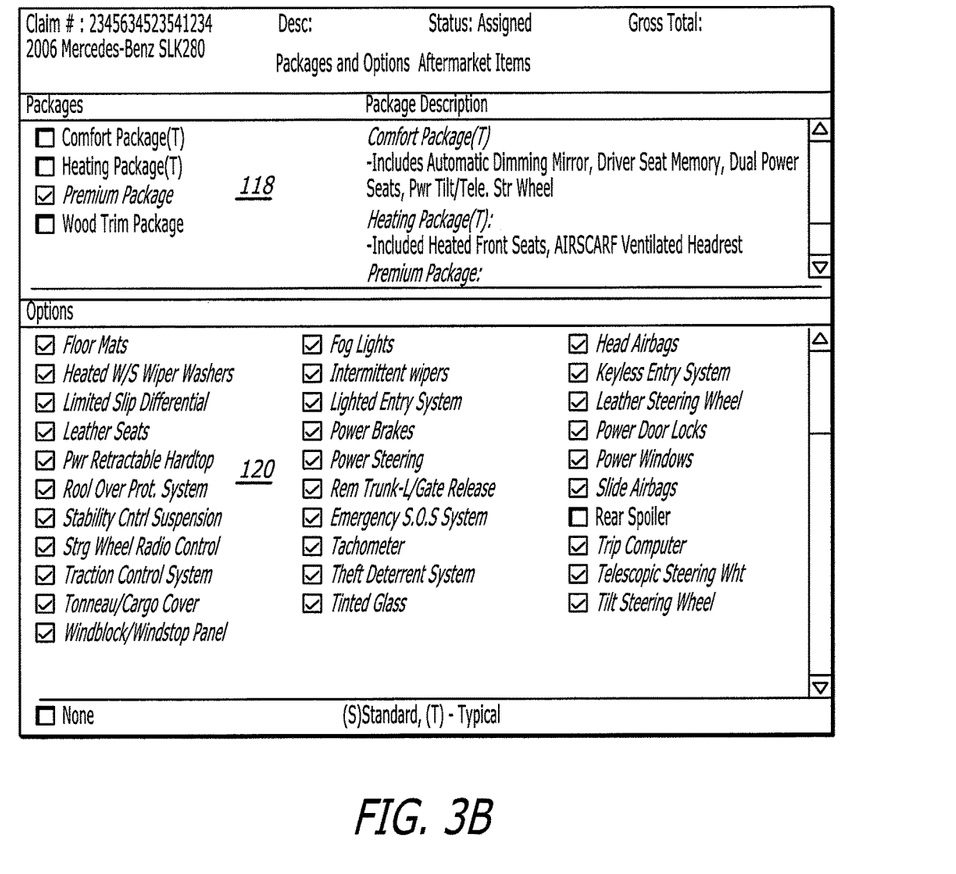

FIGS. 3A and 3B show an example of an claim page 100 with a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle packages fields 118 and vehicle options fields 120 that can be selected and deselected to indicate the options of a vehicle. Entering the VIN automatically populates certain fields of the page 100.

The basic decoding process may determine a vehicle and standard vehicle options associated with the entered VIN. The basic VIN decode can be performed by the claims server, or a separate VIN decode server. The vehicle information is automatically inserted into the page 100 as shown in FIG. 3A. Certain vehicle options are also selected as indicated by the check marks in FIG. 3B. The process also includes retrieving vehicle option information from the OEM source. The page displays the OEM vehicle option information. For example, FIG. 3B shows a REAR SPOILER field that would have been selected based on the basic VIN decode but was de-selected based on the vehicle options information provided by the OEM server. The user can further select or de-select options based on an inspection of the vehicle. The combination of VIN decoding and OEM vehicle option information provides an initial repair cost estimate or vehicle valuation that is "relatively accurate".

The basic VIN decode may generate information for more than one vehicle. For example, the basic VIN decode may generate information for both a standard package and a custom package, or for different engine sizes. The OEM vehicle information can be used to eliminate one or more pieces of the vehicle information identified in the basic VIN decode process.

Figure 4A:
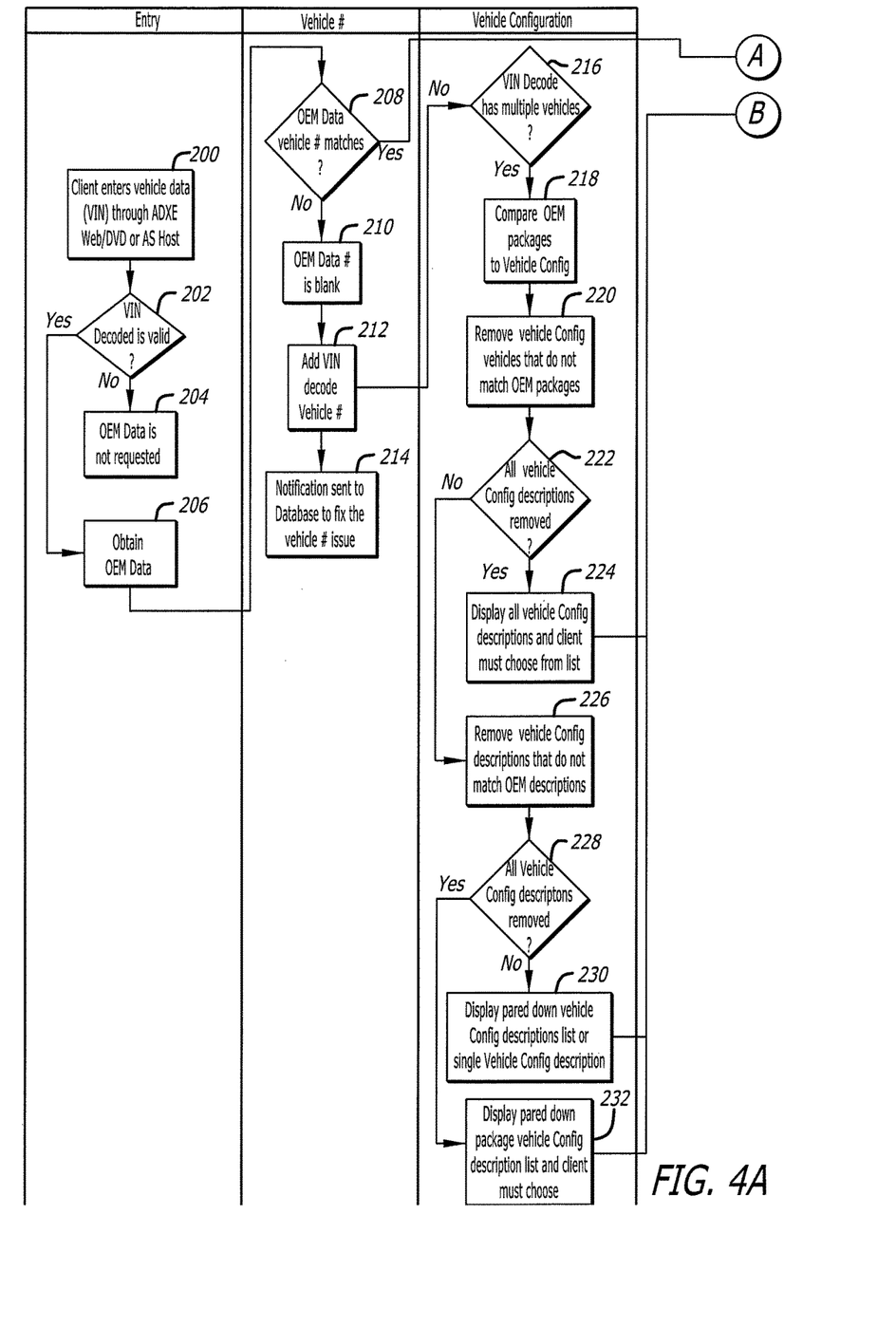
FIGS. 4A and 4B are a flowchart showing a process for automatically populating vehicle information fields based on a VIN decode, vehicle identification key, and OEM vehicle information.
Figure 4B:
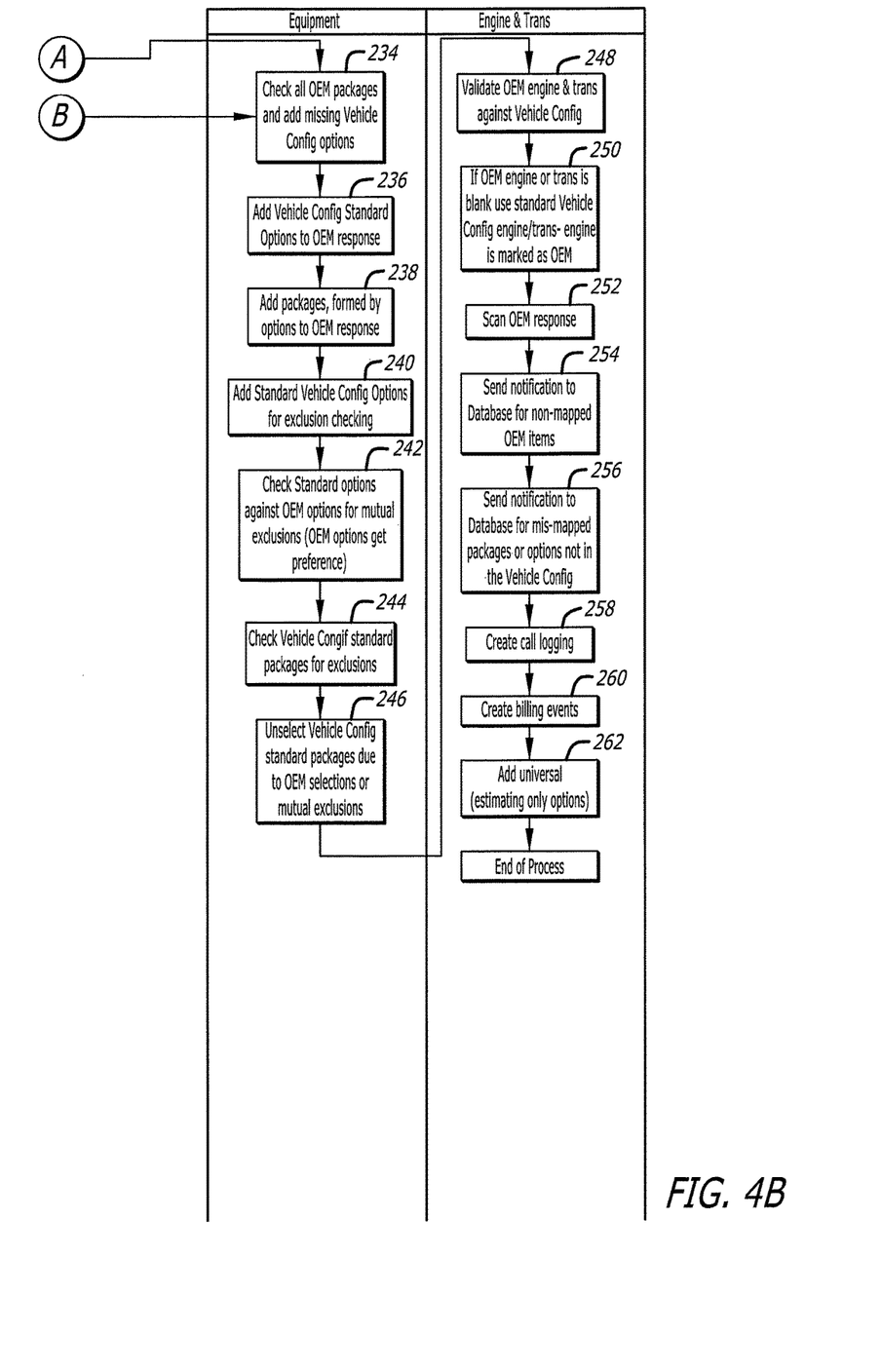

FIGS. 4A and 4B show a flowchart for the process of automatically populating the page based on the entry of a VIN. The VIN is entered and decoded in block 200. The VIN can be decoded by two different processes. By way of example, the VIN may be decoded by a process referred to as OEM decode and/or a process referred to as a basic decode. The validity of the basic VIN decode is checked in decision block 202. If the decode is invalid, OEM decode data may not be requested in block 204. If valid, OEM data for the vehicle is requested in block 206. The vehicle identification key generated by the basic decode process is compared with the OEM decode data in decision block 208. If the description and OEM data do not match then the OEM data is not used and the basic VIN decode are inserted in blocks 210 and 212, respectively. A notification can be provided in block 214.

In decision block 216, it is determined whether the basic VIN decode produced multiple vehicle identification keys. If yes, in block 218 the options and packages provided through the VIN decode are compared with the packages provided by the OEM source. In block 220 the vehicles identified by the OEM source that do not have the options and packages identified through the VIN process are removed. If this process removed all of the possible identified vehicles as determined in decision block 222 then all of the vehicle identification keys are displayed in block 224 and the user has the option of selecting from a full list of displayed descriptions. If all of the vehicle identification keys are not removed, then the vehicle identification keys that do not match the vehicle options identified by the OEM data are removed in block 226 and a pared list of vehicle identification keys are displayed in block 230. If all of the vehicle identification keys are not removed then the vehicle identification keys remaining are displayed in block 232.

The process continues to blocks 234 and 236 where the vehicle options identified by the OEM source are added to the options and packages identified in the VIN process. Packages that are formed by the added options are added to the response in block 238. The standard options identified by the OEM source are added in block 240 and a mutual exclusion check with the vehicle identification key options is performed in decision block 242. The vehicle identification key standard packages are checked for exclusions in block 244. In block 246 the process de-selects options that would have been selected by the VIN process based on the OEM source.

In block 248 the engine and transmission information produced by the vehicle identification key and OEM processes are checked. In block 250 the OEM engine and transmission is used, if blank the vehicle identification key engine and transmission is used. The response is scanned and notifications are sent in blocks 252, 254 and 256. A log and billing is created in blocks 258 and 260 and if available additional options are added in block 262 to complete the process.

Figure 5A:
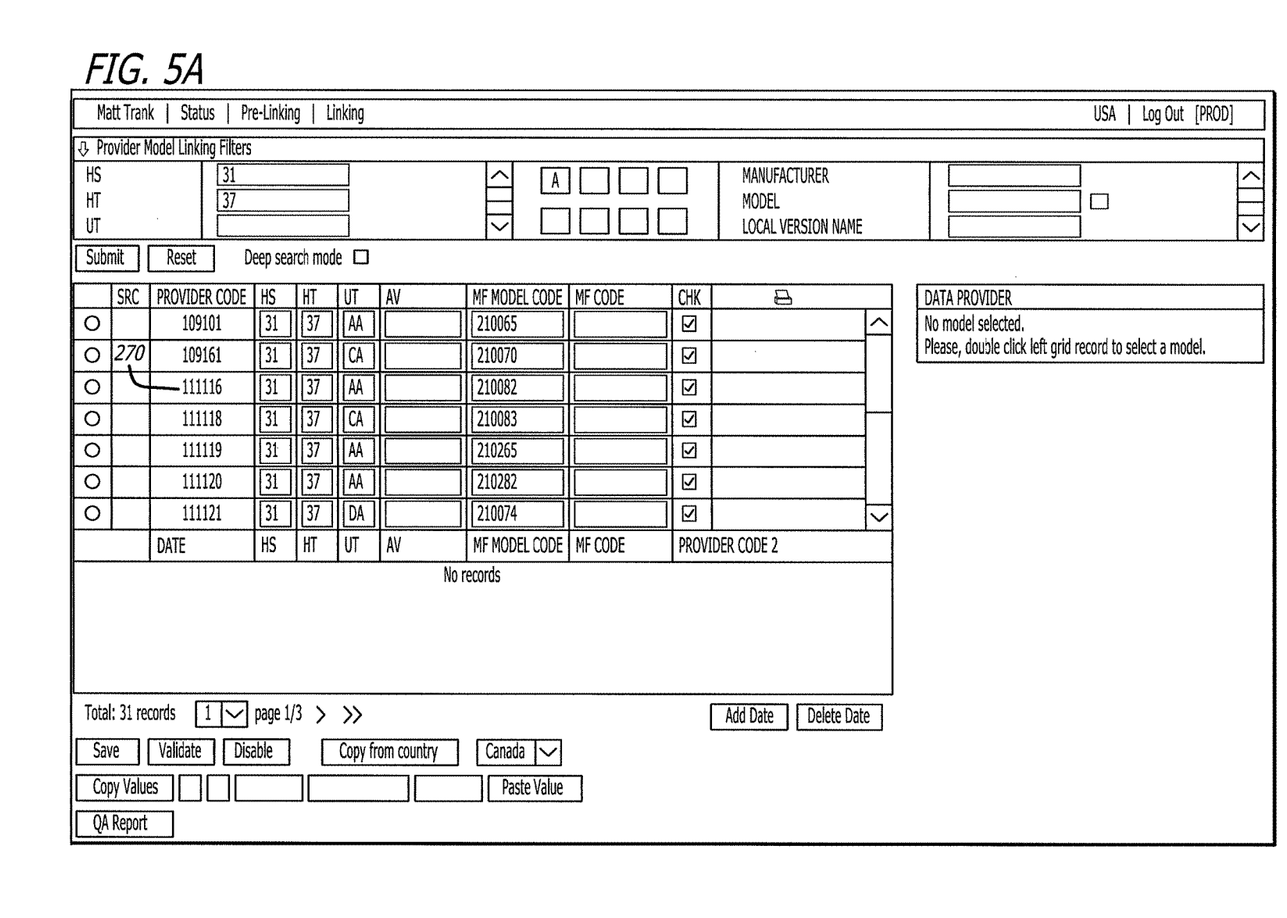
Figure 5B:
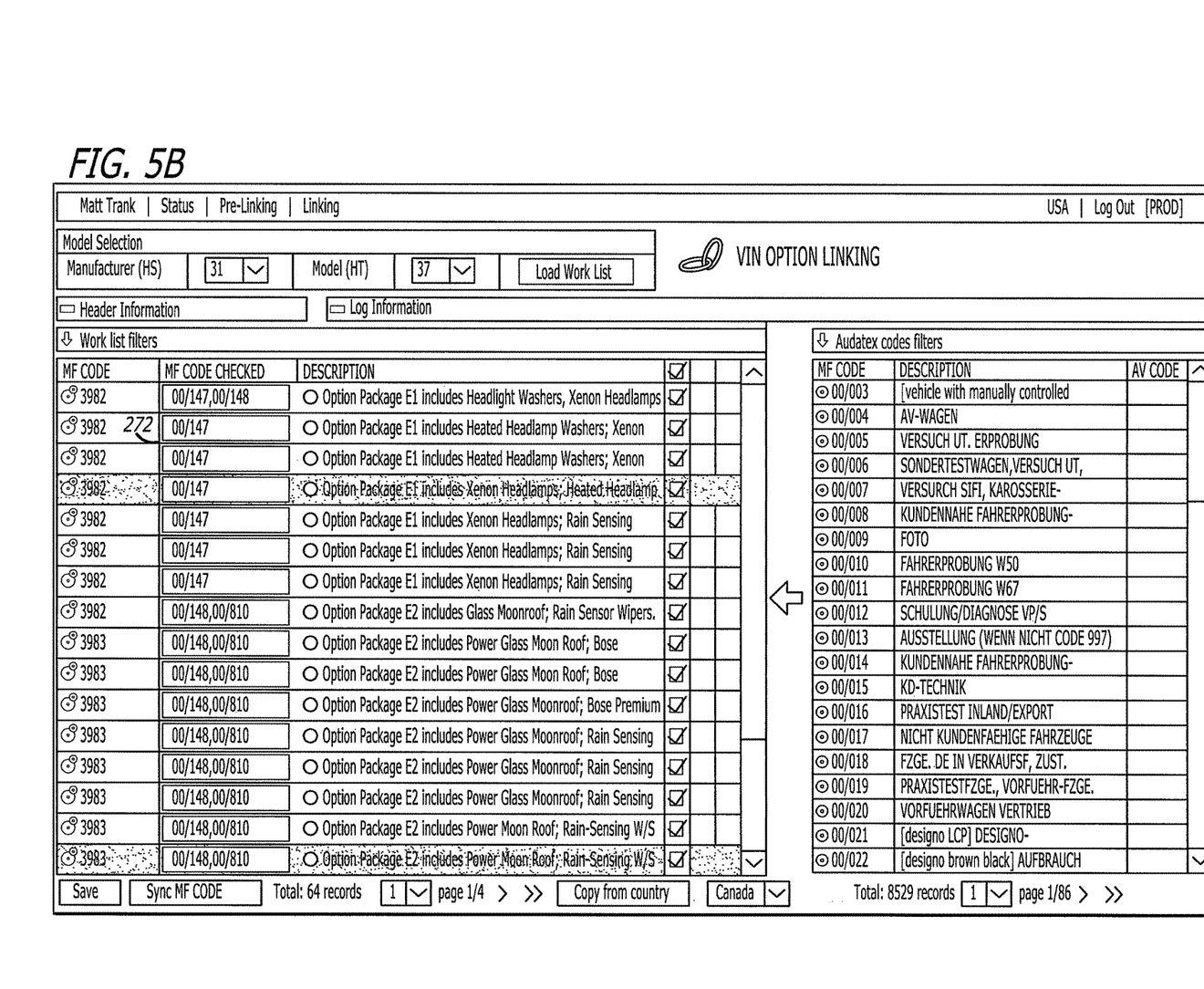
Figure 5D:
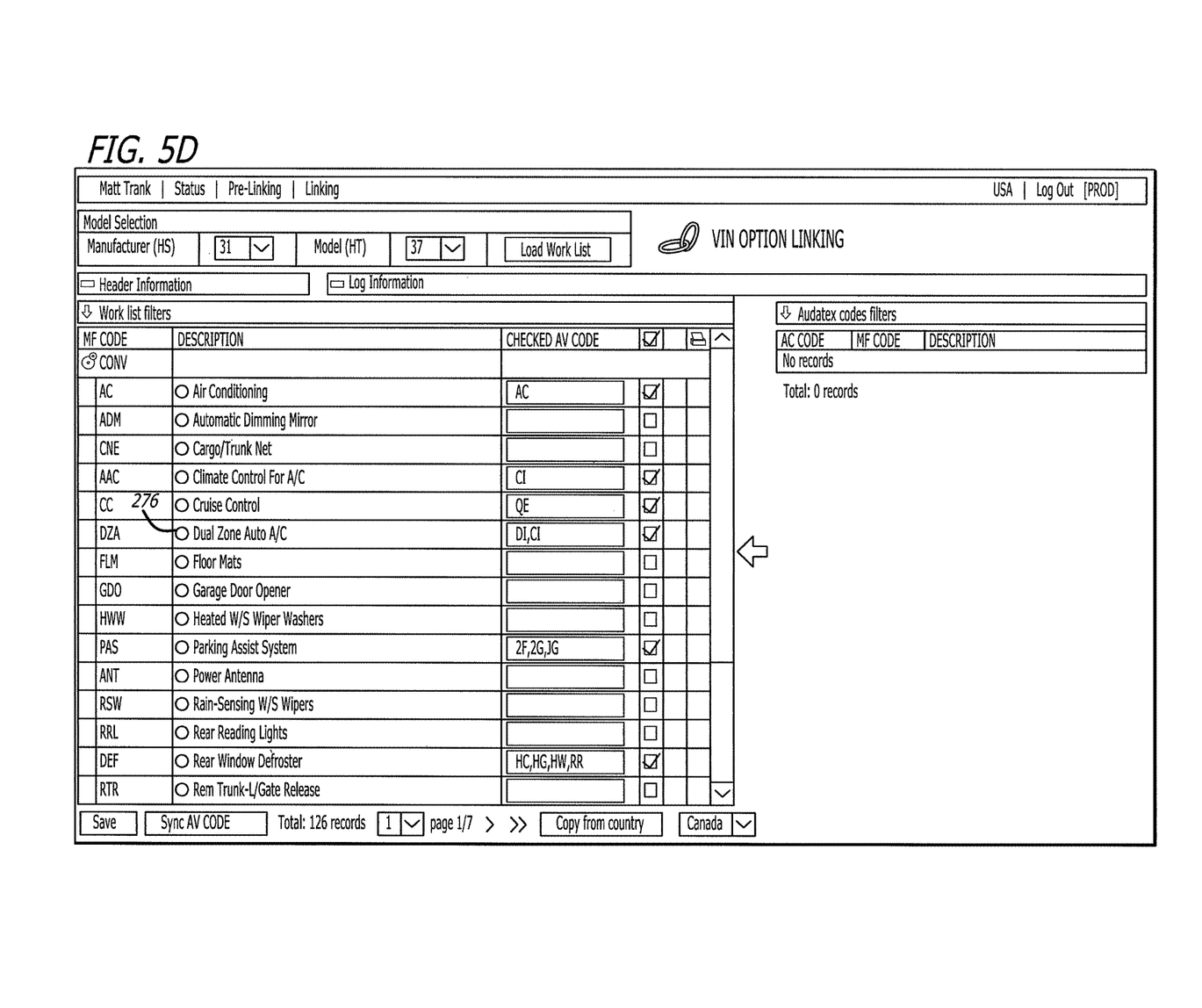

Before OEM data can be used by a client application, a linking process is utilized to map OEM data to the vehicle description keys. FIG. 5A shows an example of a linking page 270 to map OEM model numbers to vehicle description key numbers. This linking allows the vehicle identification key generated by the basic decode process to be compared with the OEM decode data in decision block 208. FIG. 5B shows an example of the linking page 272 to map OEM package codes at the make or model level to vehicle description key package names and their contents. This linking is used within blocks 218 and 234. FIG. 5C shows an example of a linking page 274 to map OEM option codes at the make or model level to vehicle description key option names which is used within blocks 242 and 246. FIG. 5D shows an example of a linking page 276 to map vehicle description key option codes at the make or model level to options that impact labor and/or part numbers on an estimate which is used within block 262.

Figure 6:
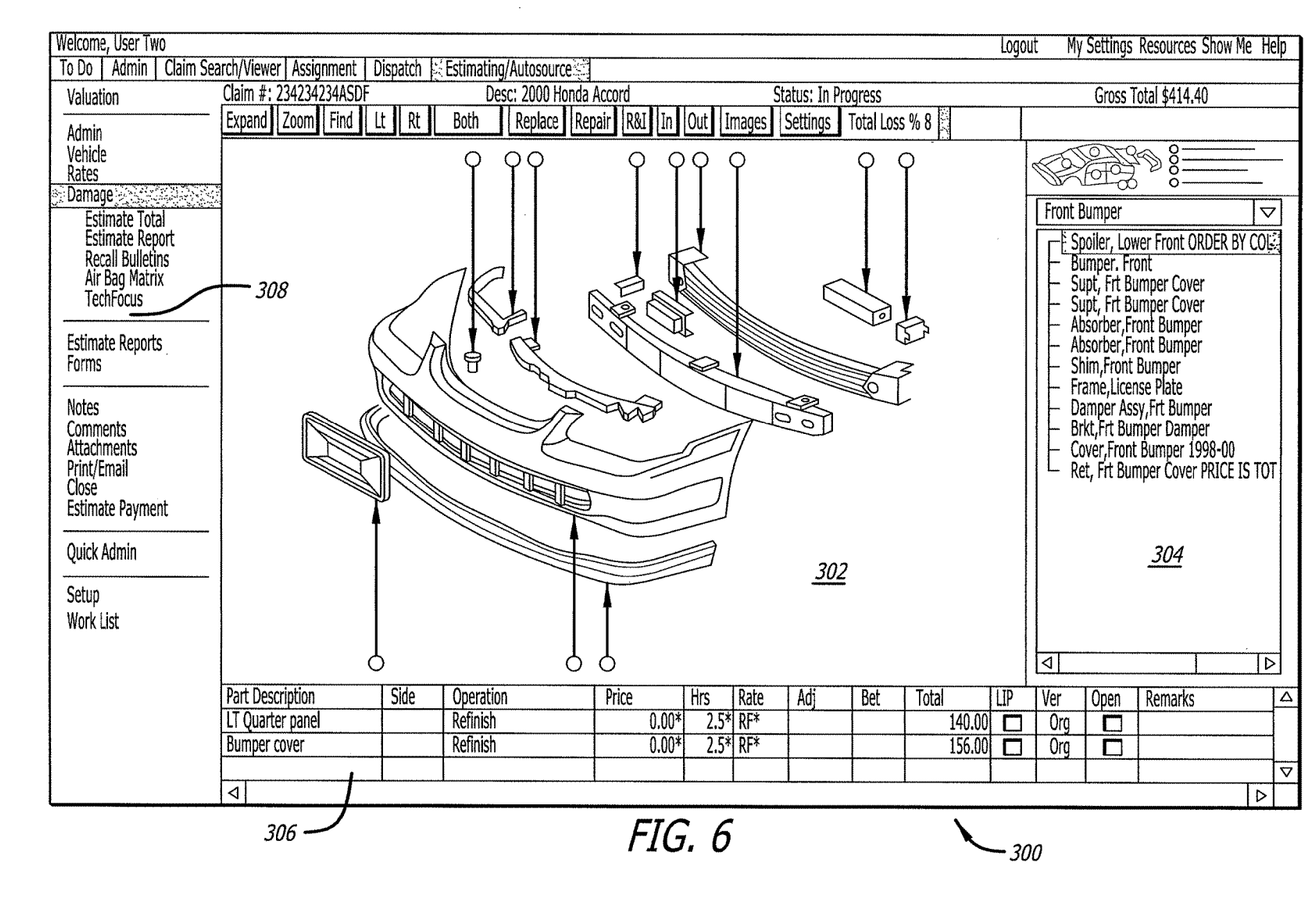
FIG. 6 is a graphical user interface used to enter and/or select damaged parts of a vehicle; and, FIG. 7 is a graphical user interface that provides a running cost total for the repair estimate of the damaged vehicle.

The representative may enter and/or select damaged parts for the vehicle. FIG. 6 shows an example of an estimating page 300 that allows the user to enter and/or select damaged parts of a vehicle. The page 300 may include a graphical section 302 that can be selected by the representative and a text section 304 that lists a plurality of selectable parts for the vehicle. The parts that are selected to be replaced or repaired can be listed in section 306. An estimate page can be displayed by selecting the "Estimate Total" link 308 shown in FIG. 6. FIG. 7 shows a page 320 that displays a running cost total of the estimated damage of the vehicle. The process may have a feature (not shown) that provides a warning to the representative that the cost total exceeds a "totaled" value at which point the representative may discontinue the process and request a vehicle valuation. After all of the parts to be repaired or damaged are selected the representative may obtain a final repair cost estimate and/or vehicle valuation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for providing vehicle information and vehicle options information for an insurance claim, comprising:

displaying at least one insurance vehicle identification page on a computer, the at least one insurance vehicle identification page includes a plurality of vehicle information fields, a plurality of vehicle options fields, and a VIN (vehicle identification number) field;

determining vehicle description information and VIN vehicle option information, and generating a vehicle description key by decoding, via the computer, a VIN entered into the VIN field;

inserting, automatically via the computer, the vehicle description information into at least one of the vehicle information fields and selecting a first number of vehicle options fields based on the VIN vehicle option information;

retrieving, via the computer, OEM (original equipment manufacturer) vehicle option information from an OEM source, comparing, via the computer using at least one linking page that maps the vehicle description key with OEM option codes, the VIN vehicle option information with the OEM vehicle option information; and, changing, via the computer, the first number of selected vehicle options fields to a second number of selected vehicle options fields if the OEM vehicle option information is different than the VIN vehicle option information and by giving a preference to the OEM vehicle option information.

2. The method of claim 1, wherein the first number of selected vehicle options fields is changed to the second number of selected vehicle options fields by deselecting at least one of the vehicle options fields selected with the VIN vehicle option information.

3. The method of claim 1, further comprising deselecting one of the first number of selected vehicle options fields in response to a user input.

4. The method of claim 1, wherein the first number of selected vehicle options fields is changed to the second number of selected vehicle options fields by selecting at least one of the vehicle options fields that was not selected with the VIN vehicle option information and is added by the OEM vehicle option information.

5. The method of claim 1, further comprising generating a repair cost estimate utilizing the second number of selected vehicle options fields.

6. The method of claim 1, further comprising generating a vehicle valuation utilizing the second number of selected vehicle options fields.

7. A non-transitory computer program storage medium, comprising computer-readable instructions to provide vehicle information and vehicle options information for an insurance claim, execution of said computer-readable instructions by at least on processor performs the steps of:

displaying at least one insurance vehicle identification page, the insurance vehicle identification page includes a plurality of vehicle information fields, a plurality of vehicle options fields, and a VIN (vehicle identification number) field;

determining vehicle description information and VIN vehicle option information, and generating a vehicle description key by decoding a VIN entered into the VIN field;

inserting the vehicle description information into at least one of the insurance vehicle information fields and selecting a first number of vehicle options fields based on the VIN vehicle option information;

retrieving OEM vehicle option information from an OEM (original equipment manufacturer) source, comparing, using at least one linking page that maps the vehicle description key with OEM option codes, the VIN vehicle option information with the OEM vehicle option information; and, changing the first number of selected vehicle options fields to a second number of selected vehicle options fields if the OEM vehicle option information is different than the VIN vehicle option information and by giving a preference to the OEM vehicle option information.

8. The non-transitory computer program storage medium of claim 7, wherein the first number of selected vehicle options fields is changed to the second number of selected vehicle options fields by deselecting at least one of the vehicle options fields selected with the VIN vehicle option information.

9. The non-transitory computer program storage medium of claim 7, further comprising deselecting one of the first number of selected vehicle options fields in response to a user input.

10. The non-transitory computer program storage medium of claim 7, wherein the first number of selected vehicle options fields is changed to the second number of selected vehicle options fields by selecting at least one of the vehicle options fields that was not selected with the VIN vehicle option information and is added by the OEM vehicle option information.

11. The non-transitory computer program storage medium of claim 7, further comprising generating a repair cost estimate utilizing the second number of selected vehicle options fields.

12. The non-transitory computer program storage medium of claim 7, further comprising generating a vehicle valuation utilizing the second number of selected vehicle options fields.

* * * * *